Nov. 8, 1966  L. L. SZEGO  3,283,480
DUST COLLECTOR

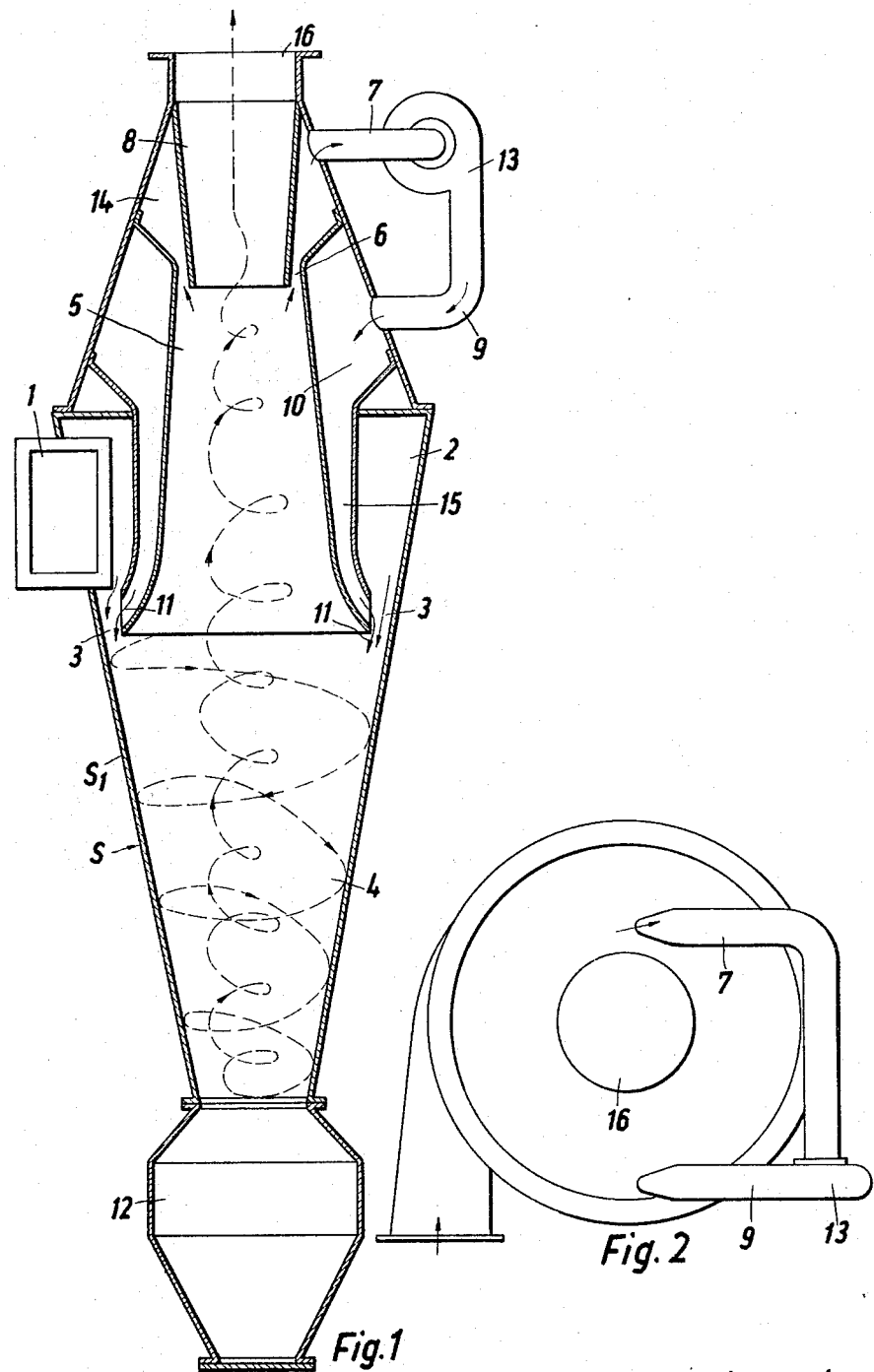

Filed Jan. 27, 1964  2 Sheets-Sheet 2

Inventor:
Laszlo Lazarus Szego
By Walter Becker

United States Patent Office 3,283,480
Patented Nov. 8, 1966

3,283,480
DUST COLLECTOR
Laszlo Lazarus Szego, South Woodford, London, England,
assignor to John Robert Berend, London, England
Filed Jan. 27, 1964, Ser. No. 340,859
Claims priority, application Germany, Jan. 26, 1963,
S 83,442
7 Claims. (Cl. 55—340)

The present invention relates to a dust separator, especially for fine dust, in which a mixture of coarser solid particles is collected at the bottom of the separator while the fine dust particles in the air or gas flow have the tendency to float toward the upper portion of the separator.

It is an object of the present invention to provide a dust separator for fine dust which will be superior to heretofore known dust separators of the above mentioned type, especially with regard to the quantity of dust separated per time unit and the fineness of the separated dust and the percentage-wise separation of dust per volume of the dust-air-mixture.

It is another object of the present invention to provide a dust separator as set forth in the preceding paragraph, which is simple in construction and operation.

These and other objects and advantages of the invention will appear more clearly from the following specification in connection with the accompanying drawing, in which:

FIG. 1 diagrammatically illustrates a longitudinal section through a dust separator according to the present invention.

FIG. 2 represents a top view of FIG. 1.

Figure 3:
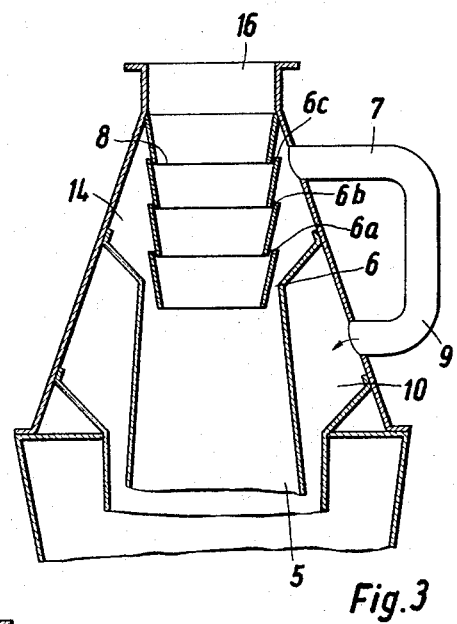
FIG. 3 shows a modified upper portion of a dust separator according to the invention.

A dust separator according to the present invention is characterized primarily by a first chamber with inlet means tangentially leading thereinto, into which first chamber extends a funnel-shaped second chamber confining with said first chamber a first annular gap, while into said second chamber there extends a tubular member having its lower end confining with said second chamber a second annular gap. The tubular member together with the upper portion of the separator confines a third chamber communicating with said second chamber through said second gap. A fourth chamber surrounds the second chamber and has an annular third gap near and in communication with said first gap while conduit means are provided for establishing communication between said third and fourth chamber.

In conformity with one embodiment of the invention which has proved highly successful, the first gap divides the lower portion of the separator into an ante-chamber into which the tangentially arranged inlet means lead, and a processing chamber. Advantageously, all of the said chambers are arranged coaxially with regard to each other.

Referring now to the drawing in detail, the dust-laden air or gas flow enters the separator S through an inlet connection 1 which is arranged laterally of and leads tangentially into an ante-chamber 2 from where it passes into the main chamber 4 through a relatively narrow gap 3 between the inner wall of the lower housing section $S_1$ and a funnel-shaped chamber 5. In chamber 4 the coarser particles of the dust are precipitated and drop into a dust collector 12. After the coarser dust particles have been separated from the air or gas in chamber 4, the air or gas will in view of the effect of the tangential inlet means, the shape of the ante-chamber 2, and the twist imparted upon the air or gas by the polar inertia thereof move upwardly into the funnel-shaped chamber 5. While passing through the funnel-shaped chamber 5, the finer dust particles will collect near the wall of chamber 5 and will through the annular gap 6 pass into the annular chamber 14. The arrangement furthermore comprises a conduit 7 communicating with the chamber 14 on one hand and with the suction side of a blower 13 on the other hand. The pressure side of blower 13 communicates through a conduit 9 with a further annular chamber 10 surrounding the funnel-shaped chamber 5 and having its mouth in the form of an annular slot 11 arranged adjacent gap 3. Therefore blower 13 will create a suction effect in annular chamber 14 so that the fine dust particles therein will be withdrawn therefrom through conduit 7 and will through conduit 9 be conveyed into chamber 10. The fine dust particles will then pass through the annular passage 15 and slot 11 into the dust flow which through the tangential inlet 1 enters the ante-chamber 2. The dust flow from ante-chamber 2 into the main chamber 4 will then carry with it the fine dust flow through slot 11 as a result of which the fine dust will be finally precipitated in chamber 4 and collected in the collecting chamber 12.

It will be appreciated that the air or gas velocity will be considerably increased by the blower 13. Consequently, also the downward speed of the air or gas entering the ante-chamber 2 through the tangential inlet 1 will greatly increase in the annular gap 11. The increased speed of the air or gas flow in gap 3 will, of course, create a suction effect at the slot 11 thereby increasing the outflow of the fine dust from chamber 10 through slot 11.

When the dust does not contain large quantities of fine particles, the blower 13 may also be dispensed with. In this instance, the conduits 7 and 9 are directly connected to each other in the manner shown in FIG. 3.

The blower 13 may also be dispensed with when the cooperation of the gap 3 with slot 11 produces a sufficient suction effect at said gap 11.

FIG. 2 clearly shows the arrangement of conduit 7, blower 13 and conduit 9 which in cooperation with each other form the return path for the fine particles with or without blower 13. The degree of efficiency of the separator is greater when employing the blower 13 but also without the blower 13 it is still sufficient provided that the percentage in fine particles in the dust flow is relatively low.

Figure 4:
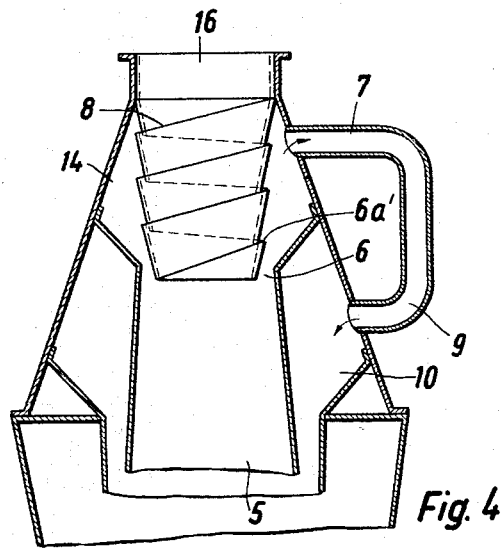
FIG. 4 shows another modified upper portion of a dust collector according to the invention.

Referring now to FIGS. 3 and 4, these figures illustrate modifications, according to which the annular gap 6 and the tubular member 8 of FIG. 1 have been modified so as to form a plurality of gaps 6a, 6b, 6c (FIG. 3) or a single spiral gap 6a' (FIG. 4). Such an arrangement increases the separation of fine particles from the central axis of chamber 5 through the funnel-shaped member 8. While in this way the single gap 6 of FIG. 1 is reduced as to its cross section, the total of the gap suface is increased by the number and length of gaps 6a, 6b and 6c. The circulated dust leaves chamber 14 through conduits 7 and 9 and passes into chamber 10. From here it continues its circulation as described above in connection with FIG. 1. As will be seen from FIG. 3, the blower 13 of FIG. 1 has been omitted, and conduit 7 directly communicates with conduit 9. After the finer dust particles have been separated from the air or gas in the tubular member 8, the air or gas will move upwards through an outlet 16.

It is, of course, to be understood that the present invention is, by no means, limited to the particular construction shown in the drawing but also comprises any modifications within the scope of the appended claims.

Thus, while the gaps 3, 6 and 11 may vary in size in conformity with the dust-material and the desired flow effect in these gaps, merely by way of example, it may be mentioned that the total cross section of the rectangular entrance of No. 1 is to be taken as 100%; the total cross section of annular gap 3 could amount to 70%, similarly the total cross section of gap No. 6 may amount up to 20%–30%; finally the slot-like annular mouth of No. 11 from chamber 15 may have a total cross section of 20%–30%.

What I claim is:

1. A dust separator comprising a lower housing section and an upper housing section mounted on said lower housing section, funnel-shaped passage means extending from said upper housing section into said lower housing section while having a flaring portion in said lower housing section, said flaring portion of said funnel-shaped passage means confining with said lower housing section an annular slot-like passage dividing said lower housing section into an inlet chamber and a processing chamber, inlet passage means tangentially leading into said inlet chamber for introducing thereinto a dust-laden fluid to be freed from dust, additional chamber means surrounding said funnel-shaped passage means and having an annular slot-shaped mouth adjacent said annular slot-like passage, said funnel-shaped passage means having that end thereof which is located in said upper housing section provided with annular outlet slot defining means, conduit means establishing communication between said annular outlet slot and said additional chamber means, discharge means having one end in flow communication with funnel-shaped passage means for discharging fluid from which dust has been withdrawn, and dust collector means arranged at the bottom of said lower housing section for collecting dust particles separated in said processing chamber.

2. A dust separator having a lower housing section and an upper housing section mounted on said lower housing section, said lower housing section having an upper end provided with inlet means leading tangentially thereinto for introducing a dust-laden fluid to be freed from dust into said lower housing section, funnel-shaped passage means arranged in part in said upper housing section and having a flaring portion extending into said lower housing section and with an adjacent wall portion thereof confining a first annular gap, tubular means arranged in said upper housing section in spaced relationship to said lower housing section and having one end arranged adjacent that end portion of said funnel-shaped passage means which is remote from said lower housing section, said one end of said tubular means together with the adjacent end portion of said funnel-shaped passage means confining a second annular gap, discharge means connected to the other end of said tubular means for discharging fluid from which dust has been withdrawn, first wall means together with said tubular means and said upper housing section confining a first chamber, second wall means surrounding said funnel-shaped passage means in spaced relationship thereto and together with said upper housing section and said funnel-shaped passage means confining a second chamber having an annular outlet slot adjacent said first gap, conduit means establishing communication between said first and said second chamber, and dust collecting means arranged at and connected to the lower end of said lower housing section.

3. A dust separator according to claim 1, in which said inlet chamber and said additional chamber means are arranged substantially coaxially with regard to each other.

4. A dust separator according to claim 2, in which said first chamber surrounds said tubular means, and in which said second chamber surrounds said funnel shaped passage means.

5. An arrangement according to claim 1, which includes suction blower means interposed in said conduit means which establishes communication between said annular outlet slot and said additional chamber means, the suction side of said blower means being connected to said annular outlet slot and the pressure side of said blower means being connected to said additional chamber means.

6. A dust separator according to claim 2, in which said tubular means is provided with a plurality of axially spaced annularly shaped slot means.

7. A dust separator comprising a conical downwardly tapering lower housing section and also comprising an upper housing section mounted on said lower housing section, funnel-shaped passage means extending from said upper housing section into said lower housing section and having its lower end slightly spaced from the adjacent wall portion of said lower housing section so as to confine therewith a first annular slot-like passage, inlet passage means tangentially leading into the upper portion of said lower housing section for introducing thereinto a dust laden fluid to be freed from dust, said funnel-shaped passage means having that end thereof which is remote from said first annular slot-like passage provided with a second annular slot-like passage, discharge means having one end in flow communication with said funnel-shaped passage means for discharging fluid from which dust has been withdrawn, chamber means surrounding said funnel-shaped passage means and having an annular slot-shaped mouth adjacent said first annular slot-like passage, and conduit means establishing communication between said second slot-like passage and said chamber means.

References Cited by the Examiner

UNITED STATES PATENTS

| | | | |
|---|---|---|---|
| 2,039,115 | 4/1936 | Reif | 55—340 |
| 3,060,664 | 10/1962 | Moraski. | |
| 3,254,478 | 6/1966 | Szego | 55—340 |

FRANK W. LUTTER, *Primary Examiner.*